United States Patent
Tischler

(10) Patent No.: US 7,236,578 B2
(45) Date of Patent: Jun. 26, 2007

(54) SYSTEM AND METHOD FOR REMOTELY ACCESSING CALLER ID INFORMATION

(75) Inventor: Ralph Tischler, Surrey (CA)

(73) Assignee: VTech Telecommunications Limited, New Territory (HK)

( * ) Notice: Subject to any disclaimer, the term of this patent is extended or adjusted under 35 U.S.C. 154(b) by 357 days.

(21) Appl. No.: 10/338,007

(22) Filed: Jan. 8, 2003

(65) Prior Publication Data

US 2004/0131168 A1 Jul. 8, 2004

(51) Int. Cl.
*H04M 1/56* (2006.01)
*H04M 1/64* (2006.01)
*H04M 3/42* (2006.01)

(52) U.S. Cl. .............. 379/142.06; 379/88.21; 455/415

(58) Field of Classification Search .......... 379/88.19, 379/88.2, 88.21, 142.01, 142.06, 142.15, 379/201.02, 201.05, 207.15; 455/415, 462, 455/550.1, 566
See application file for complete search history.

(56) References Cited

U.S. PATENT DOCUMENTS

| | | | | |
|---|---|---|---|---|
| 5,062,132 A | * | 10/1991 | Yasuda et al. | 455/557 |
| 5,515,420 A | | 5/1996 | Urasaka et al. | |
| 5,752,195 A | * | 5/1998 | Tsuji et al. | 455/462 |
| 5,953,656 A | * | 9/1999 | Bertocci | 455/412.2 |
| 6,041,111 A | * | 3/2000 | Shelton | 379/201.04 |
| 6,574,318 B1 | * | 6/2003 | Cannon et al. | 379/142.01 |
| 6,928,154 B1 | * | 8/2005 | Cheaito et al. | 379/207.15 |
| 6,973,300 B1 | * | 12/2005 | Homan et al. | 455/419 |
| 2002/0082000 A1 | * | 6/2002 | Sakai et al. | 455/414 |
| 2004/0066920 A1 | * | 4/2004 | Vandermeijden | 379/88.19 |
| 2004/0067751 A1 | * | 4/2004 | Vandermeijden et al. | 455/414.1 |

FOREIGN PATENT DOCUMENTS

| | | |
|---|---|---|
| EP | 1 051 021 | 11/2000 |
| EP | 1 152 586 | 11/2001 |
| GB | 2 294 848 | 11/1995 |
| GB | 2 318 951 | 5/1998 |
| GB | 2 320 844 | 7/1998 |

OTHER PUBLICATIONS

GB Search Report Dated May 26, 2004.

* cited by examiner

*Primary Examiner*—Bing Q. Bui
(74) *Attorney, Agent, or Firm*—Paul, Hastings, Janofsky & Walker LLP

(57) ABSTRACT

A remote access device is provided with access to caller ID information stored in a base unit. A communication path between the remote access device and the base unit is established. Caller ID information is transmitted from the base unit to the remote access device according to a communication protocol. The communication path can include a telephone network such as the public-switched telephone network.

30 Claims, 3 Drawing Sheets

SYSTEM AND METHOD FOR REMOTELY ACCESSING CALLER ID INFORMATION

BACKGROUND

1. Field of the Invention

The present invention relates generally to caller identification systems. More particularly, the present invention relates to remote access of caller identification information.

2. Background of the Invention

Caller identification (ID) information provides call recipients with information about the incoming calls, such as calling party number and calling party name. The caller ID information is displayed to the called party on a caller ID device. The called party can use this information for a number of reasons, including for example, determining whether or not to answer the call.

In addition to displaying the caller ID information to the called party, many caller ID devices can to store caller ID information. The storage capability provides a convenient history of callers to the called party. This history is useful when the called party is not able to immediately answer the telephone call. For example, the called party may not be home, may be unavailable or may be already engaged in a telephone call. Thus, the called party can review the history stored in the caller ID device to see who called them.

Cordless telephones provide users with the convenience of mobility without the high costs associated with cellular telephones such as separate monthly service contracts. Moreover, cordless telephones operate over the public-telephone switched system (PSTN). Consequently, they are not susceptible to the kinds of service disruptions that can occur with using mobile telephones.

Cordless telephone systems are also able to receive and store caller ID information. Generally, the caller ID information is collected by the base unit and transmitted periodically to a cordless handset associated with the base unit for storage. In this manner, the cordless phone user has access the caller ID information in the handset so long as the handset is within range of the base unit. In addition, the caller ID information can be updated in the handset as new caller ID information is received so long as the handset is within range of the base unit.

However, the ability to transmit received caller ID information to the handset for storage is lost if the handset is outside the range of the base unit. For example, many cordless telephone handsets can be used with adapters that provide access to the PSTN, even without a base unit. For example, a cordless telephone user having such an adapter in his or her office can take a cordless telephone handset from their home to their office and use the cordless handset as their office telephone handset. However, because the telephone handset at the office is out-of-range of the base unit, caller ID information received at the base unit cannot be transmitted to the cordless handset. Consequently, the caller ID information stored in the cordless handset can quickly become stale. Thus, the ability to user caller ID information in conventional cordless telephone systems can impose limits on the mobility associated with such systems.

BRIEF SUMMARY OF THE INVENTION

An embodiment of the present invention solves the foregoing problems in the art by providing remote access to the caller ID information stored in a cordless telephone base unit. A remotely located access device accesses the caller ID information stored in a the telephone base unit with which the access device is associated. For example, in an embodiment of the present invention, the access device is a cordless telephone that obtains the caller ID information through a telephone network, such as the PSTN, using a modem adapter to gain access to the telephone network. A modem data connection is established with the cordless telephone base unit over the telephone network. The caller ID information stored in the cordless telephone base unit is transmitted to the access device for display to a user.

In one embodiment, the present invention is a system for remotely accessing caller ID information over a telephone network. The system includes a base unit and an access device corresponding to the base unit. The base unit includes a caller ID database into which caller ID information is stored. The caller ID information has one or more telephone numbers and information corresponding to the telephone numbers. Telephonic communication is established between the access device and the base station such that at least a portion of the caller ID information is transmitted from the caller ID database to the access device.

In another embodiment, the present invention is a method for providing remote access to caller ID information. The method includes establishing a telephone call to a base unit from a remote access device, receiving a remote command for caller ID information; and transmitting the caller ID information from the base unit to the remote access device.

DETAILED DESCRIPTION OF THE INVENTION

Figure 1:
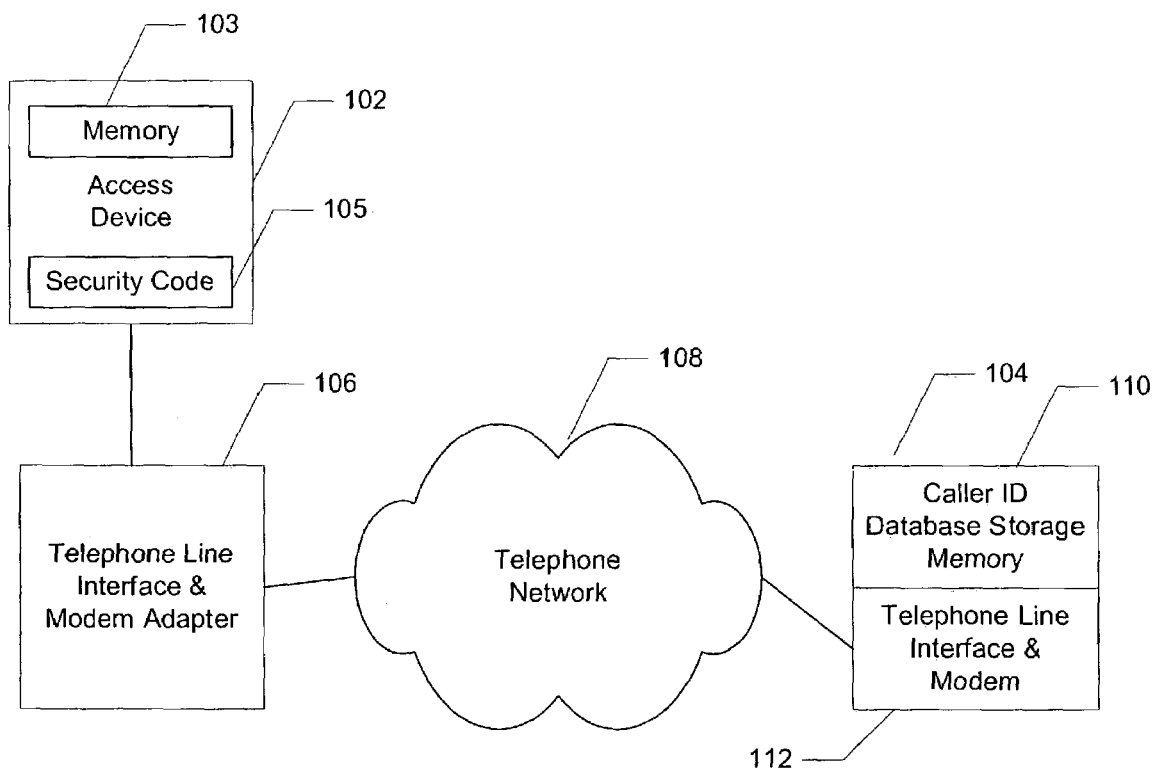
FIG. 1 is a schematic diagram illustrating system for remotely accessing caller identification information stored in a cordless telephone case unit.

FIG. 1 is a schematic diagram illustrating system for remotely accessing caller identification information. An access device 102 is located remotely from a cordless telephone base unit 104. Preferably, access device 102 is associated with base unit 104. For example, in one embodiment, access device 102 and base unit 104 are manufactured to interoperate with one another. In another embodiment, access device and/or base unit 104 are reconfigured to interoperate with one another. Access device 102 can be any device that can communicate directly or indirectly with base unit 104. For example, in one embodiment of the present invention, access device 102 is a cordless handset. In another embodiment of the present invention, access device 102 is a computer configured with a modem to communicate with base unit 104.

Access device 102 further includes a memory 103. Memory 103 is used to store caller ID information. The caller ID information can be transmitted to access device 102 for storage in memory 103 by base unit 104.

Base unit 104 includes a caller ID database 110. Caller ID database 110 is a database for storing telephone numbers and information associated with the telephone numbers. The telephone numbers and associated information can be entered manually and/or automatically. For example, a user of base unit 104 can use handset 102 to enter information associated with the telephone number. Alternatively, the information can be entered into database 102 automatically.

Any information can be stored in caller ID database 110. For example, in one embodiment of the present invention, caller ID database 110 stores telephone numbers corresponding to telephone calls that have not been answered and information associated with those telephone numbers, such as calling party name.

Access device 102 is coupled to an adapter 106. Adapter 106 provides access device 102 access to a telephone network, such as the public-switched telephone network (PSTN). For example, where access device 102 is a personal computer (PC), adapter 106 is the internal line interface and modem of the PC. Using adapter 106, access device 102 can establish a point-to-point communication path with base unit 104. For example, in one embodiment of the present invention, adapter 106 provides a modem for access device 102 to enable access device 102 to establish a point-to-point modem connection with a modem located in base unit 107. The point-to-point modem connection provides a communication path for establishing communication between access device 102 and base unit 104. The communication path enables transfer of caller ID information from access device 102 to base unit 104.

In operation, access device 102 establishes a telephone call with base unit 104. Once the communication is established, base unit 104 can download information stored in a caller ID database 110. Access device 102 establishes communication with base unit 104 according to a communication protocol. The communication protocol can be any protocol that allows base unit 104 to detect access device 102 to set up a communication path over which caller ID information can be transmitted. An exemplary communication protocol is the well-known v.22bis protocol, which uses "AT" commands to control communication.

In an exemplary embodiment of the present invention, access device 102 is pre-configured to call base unit 104. The call can be initiated in any manner. For example, the call can be initiated using standard dialing, speed dialing or any other method for calling base unit 104 from access device 102. In one embodiment of the present invention, access device 102 calls base unit 104 through a modem of adapter 106. A communication path is established according to a communication protocol such as v.22bis.

As part of the communication protocol, base unit 104 detects the presence of access device 102. This can be accomplished by base unit 104 "pinging" access device 102. For example, access device 102 can send a preamble that base unit 104 recognizes as part of a negotiation.

To improve security, an embodiment of the present invention provides that a unique security code must be sent from access device 102 to base unit 104 in response to the ping prior to access device 102 being given access to caller ID information. For example, the security code can be stored in a security code memory 105. In response to a ping from base unit 104, the security code access device 102 retrieves the security code from security code memory 105 and transmits it to base unit 102 to authorize access device 105.

In one embodiment of the present invention, the security code is pre-configured by the manufacturer and stored in security code memory 105. In another embodiment of the present invention, the security code is chosen by the user and stored in security code memory 105. In another embodiment, the user is prompted to enter the security code in response to the ping by base unit 104.

The security code can be implemented to provide an indication of what type of device access device 102 is as well as to provide a level of security to prevent unauthorized users from penetrating the system. For example, the security code can be implemented to identify access device 102 so that base unit 104 will not only know that access device 102 is authorized to access caller ID information, but what type of device access device 102 is. In another embodiment of the present invention, a separate identification code is stored in access device 102. The separate identification code can be sent to base unit 104 in response to a "ping" to identify access device 102.

When access device 102 responds to the ping and identifies itself as an access device associated with base unit 104 (and provides an appropriate security code for embodiments of the present invention implementing security codes), base unit 104 can take a number of actions. In one embodiment of the present invention, base unit 104 responds by transmitting caller ID information stored in caller ID database 110 automatically to be stored in memory 103.

Figure 2:
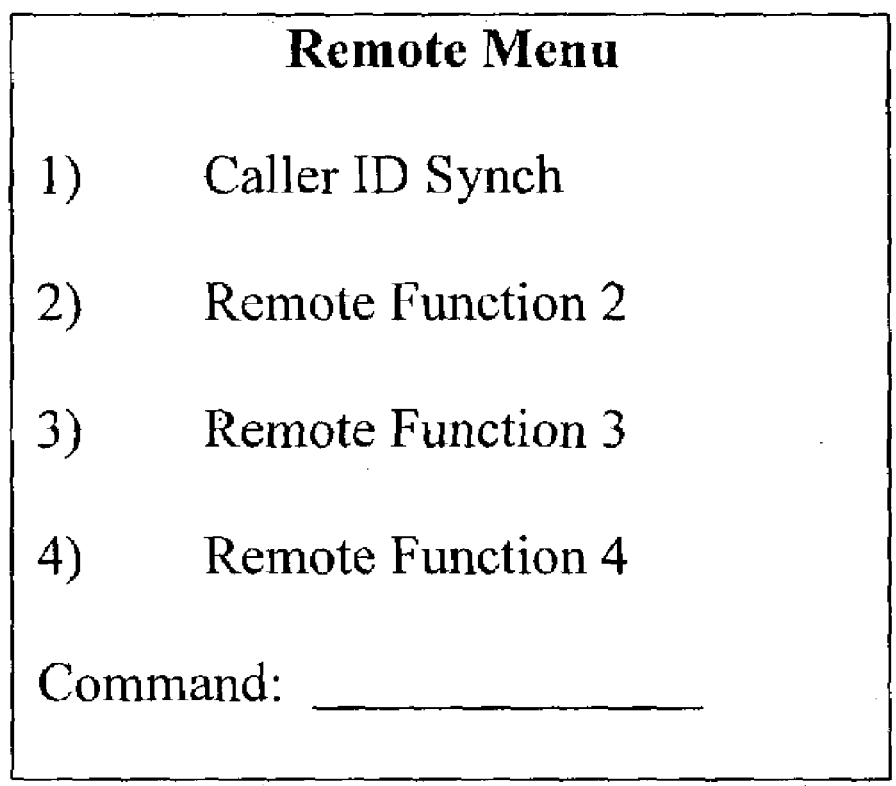
FIG. 2 is an exemplary remote menu according to an embodiment of the present invention.

In an alternative embodiment of the present invention, base unit responds to the presence of access device 102 by transmitting a remote menu to access device 102 to be displayed to a user of access device 102. In one embodiment of the present invention, the remote menu is a list of selections that the user can choose to perform various remote functions. An exemplary remote menu 202 is illustrated in FIG. 2. A user can enter a selection from remote menu 202 in a command line prompt or using another selection mechanism such as a pointing device.

One function is "caller ID synch". Selection of the "caller ID synch" function causes base unit 104 to synchronize caller ID information stored in memory 103 with caller ID information stored in caller ID database 110. For example, in one embodiment of the present invention, base unit 104 extracts information from caller ID database 110 and transmits the extracted caller ID information to access device 102. Access device 102 receives the caller ID information and stores it in memory 103.

When sending caller ID information from caller ID database 110 to access device 102 in any of the above-described embodiments of the present invention, base unit 104 can extract some or all caller ID information from caller ID database 110 to transmit to access device 102. For example, base unit 104 can transmit all caller ID information stored in caller ID database 110 to be stored in access device 102 or only new caller ID information to be stored in access device 102. In this case, new caller ID information is caller ID information that has not already been transmitted to access device 102.

Figure 3:
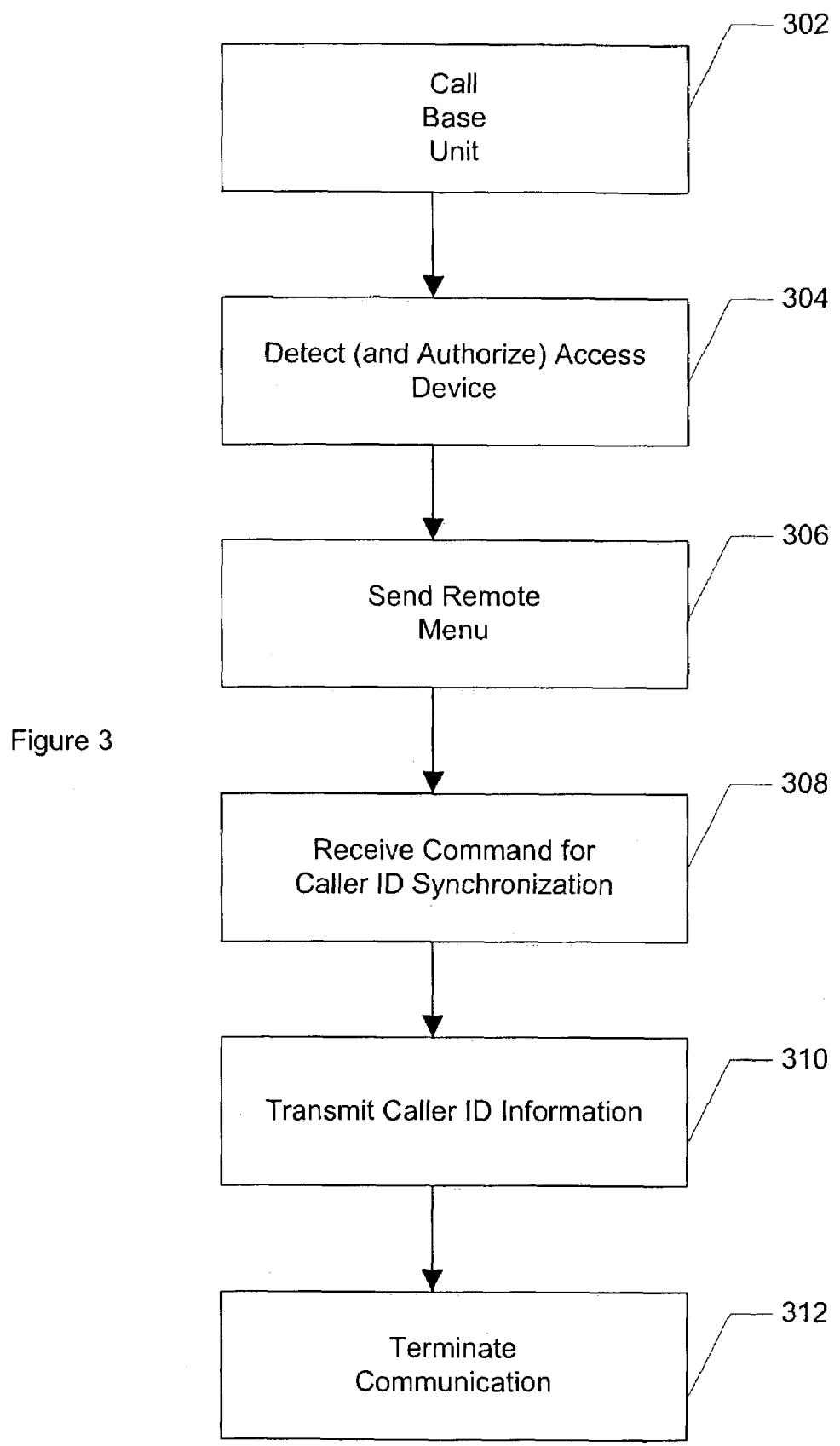
FIG. 3 is a flow chart for a method for providing remote access to caller ID information according to an embodiment of the present invention.

FIG. 3 is a flow chart for a method for providing remote access to caller ID information according to an embodiment of the present invention. The method begins by establishing a telephone call from an access device to a base unit in step 302. The method continues by detecting the access device in step 304. As described above, this detection can be via pinging and negotiation between the access device and the base unit. Further, a security code that must be detected by the base station prior to providing access to caller ID information can be implemented in embodiments of the present invention to improve security as described above.

After the access device is detected (and authorized in an embodiment of the present invention implementing security codes), a remote menu is sent to the access device to be displayed to a user in step 306. In step 308, a remote command is received from the access device. If the command is a caller ID synchronization command, caller ID information is transmitted to the access device in step 310.

After the caller ID information has been transmitted, the communication is terminated in step 312.

As described above, some or all of the caller ID information can be transmitted to the access device. For example, in one embodiment of the present invention only new caller ID information is transmitted in response to the caller ID synchronization command.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for remotely accessing caller ID information over a telephone network, comprising:
    a cordless handset having a memory for storing caller ID information and a modem for establishing telephonic communication with a telephone network;
    a base unit associated with the cordless handset having caller ID database into which caller ID information is stored, the caller ID information comprising one or more telephone numbers and information corresponding to the telephone numbers, wherein telephonic communication is established between the cordless handset and the base unit through the telephone network, such that at least a portion of the caller ID information is transmitted from the caller ID database to the cordless handset to be stored in the memory through the telephone network, wherein the telephonic communication is initiated via speed dialing with the cordless handset.

2. The system recited in claim 1, further comprising:
    a telephone line interface and modem adapter by which the cordless handset accesses the PSTN; and
    a telephone line interface and modem by which the base unit accesses the PSTN.

3. The system recited in claim 1, wherein the telephone network is a PSTN.

4. The system recited in claim 1, wherein the cordless handset further comprises a scrollable screen for viewing the caller ID information that is sent to it.

5. The system recited in claim 1, further comprising a remote menu, the remote menu comprising a plurality of remote functions that can be performed.

6. The system recited in claim 5, wherein one of the plurality of remote functions is a caller ID synchronization function that synchronizes the caller ID information stored in the cordless handset with caller ID information stored in the caller ID database.

7. The system recited in claim 1, wherein the cordless handset comprises a security code memory for storing a security code that is sent to the base unit to authorize the remote access device to receive the caller ID information.

8. The system recited in claim 7, wherein the security code also identifies the cordless handset.

9. A method for providing remote access to caller ID information, comprising:
    establishing a telephone call to a base unit of a cordless telephone system from a remote access device associated with the base unit, wherein the telephonic call is initiated, via speed dialing;
    receiving a remote command for caller ID information; and
    transmitting the caller ID information from the base unit to the remote access device.

10. The method recited in claim 9, further comprising pinging the remote access device to detect it prior to transmitting the caller ID information.

11. The method recited in claim 9, further comprising receiving new caller ID information, and transmitting only the new caller ID information in response to the remote command for caller ID information.

12. The method recited in claim 9, further comprising providing a remote menu to a user of the remote access device.

13. The method recited in claim 9, further comprising terminating the communication after the caller ID information is transmitted to the remote access device.

14. The method recited in claim 9, further comprising establishing a point-to-point modem communication path between the remote access device and the base unit.

15. The method recited in claim 9, further comprising authorizing the remote access device to receive the caller ID information.

16. The method recited in claim 15, further comprising identifying the remote access device.

17. A system for providing remote access to caller ID information, comprising:
    means for establishing a telephone call to a base unit of a cordless telephone system from a remote access device associated with the base unit, wherein the telephone call is initiated via speed dialing;
    means for receiving a remote command for caller ID information; and
    mean for transmitting the caller ID information from the base unit to the remote access device.

18. The system recited in claim 17, further comprising means for pinging the remote access device to detect it prior to transmitting the caller ID information.

19. The system recited in claim 17, further comprising means for receiving new caller ID information, and transmitting only the new caller ID information in response to the remote command for caller ID information.

20. The system recited in claim 17, further comprising means for providing a remote menu to a user of the remote access device.

21. The system recited in claim 17, further comprising means for terminating the communication after the caller ID information is transmitted to the remote access device.

22. The system recited in claim 17, further comprising means for establishing a point-to-point modem communication path between the remote access device and the base unit.

23. The system recited in claim 17, further comprising means for authorizing the remote access device to receive the caller ID information.

24. The system recited in claim 23, further comprising means for identifying the remote access device.

25. A cordless handset for providing access to caller ID information stored in a base unit associated with the cordless handset, wherein the handset is out of range of the base unit, comprising:
- a modem for establishing telephonic communication through a telephone network between the cordless handset and the base unit, and for sending a command to the base unit instructing the base unit to transmit the caller ID information to the handset through the telephone network, wherein the telephonic communication is initiated via speed dialing;
- a memory for storing the caller ID information received from the base unit; and
- a screen for viewing the caller ID information.

26. The cordless handset of claim 25, wherein the screen is scrollable.

27. The cordless handset of claim 25, further comprising a security code memory for storing a security code that is sent to the base unit through the telephone network to authorize the base unit to send the caller ID information.

28. The cordless handset of claim 27, wherein the security code also identifies the cordless handset.

29. The cordless handset of claim 25, further comprising a command menu that stores a menu of remote access commands viewable on the screen.

30. The cordless handset of claim 25, wherein the telephone network is the PSTN.

* * * * *